United States Patent
Blum et al.

(10) Patent No.: US 6,553,017 B1
(45) Date of Patent: Apr. 22, 2003

(54) COMMUNICATION DEVICE AND METHOD FOR DETERMINING THE SIGNAL QUALITY OF COMMUNICATION RESOURCES IN A COMMUNICATION SYSTEM

(75) Inventors: Philip C. Blum, Chicago, IL (US); Douglas A. Lenz, Plantation, FL (US); J. Christopher Stanaway, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/339,417

(22) Filed: Jun. 24, 1999

Related U.S. Application Data

(60) Provisional application No. 60/098,847, filed on Sep. 2, 1998.

(51) Int. Cl.[7] ............................................. H04B 7/212
(52) U.S. Cl. ........................ 370/332; 370/337; 370/352
(58) Field of Search ................... 370/337, 345, 370/347, 349, 442, 471, 473, 493, 496, 498, 902, 314, 336, 522, 332, 326, 352

(56) References Cited

U.S. PATENT DOCUMENTS

| | | | | |
|---|---|---|---|---|
| 5,450,616 A | * | 9/1995 | Rom ........................... | 455/522 |
| 5,490,288 A | * | 2/1996 | Wiatrowski .................. | 455/423 |
| 5,606,729 A | * | 2/1997 | D'Amico et al. ........ | 455/226.2 |
| 5,856,804 A | * | 1/1999 | Turcotte et al. ............. | 342/371 |
| 5,893,035 A | * | 4/1999 | Chen ........................... | 455/442 |
| 5,991,286 A | * | 11/1999 | Labonte et al. ............. | 370/337 |
| 6,044,270 A | * | 3/2000 | Raith .......................... | 455/434 |
| 6,131,015 A | * | 10/2000 | Hill et al. .................... | 455/447 |
| 6,219,559 B1 | * | 4/2001 | Hill et al. .................... | 455/522 |
| 6,396,825 B1 | * | 5/2002 | Jasper et al. ................. | 370/336 |

* cited by examiner

*Primary Examiner*—Dang Ton
*Assistant Examiner*—Thong N. Vu
(74) *Attorney, Agent, or Firm*—Jeffrey K. Jacobs

(57) ABSTRACT

A communication device (100) receives a first portion of an information packet via a primary communication resource (102). During a time period otherwise allocated for receiving a second portion of the information packet, the communication device (100) determines the signal quality of one or more other communication resources. The communication device then requests retransmission of the second portion of the information packet.

14 Claims, 2 Drawing Sheets

COMMUNICATION DEVICE AND METHOD FOR DETERMINING THE SIGNAL QUALITY OF COMMUNICATION RESOURCES IN A COMMUNICATION SYSTEM

This application claims the benefit of provisional application No. 60/098,874, filed Nov. 2, 1998.

FIELD OF THE INVENTION

The present invention relates generally to communication systems and, in particular, to a method for determining the signal quality of communication resources in a communication system.

BACKGROUND OF THE INVENTION

Multi-cell communication systems are prevalent today. In such systems, a mobile communication device is provided communication services by fixed communication devices located in the same cell, or coverage area, as the mobile communication device. The cell providing such services at a particular time is known as the serving cell of the mobile communication device. When the signal quality of a mobile communication device's serving cell becomes unacceptable, a new serving cell is usually selected.

The criteria for when to select a new serving cell and which serving cell to choose, when many are available, vary among communication systems. One approach to serving cell selection requires the mobile communication device to periodically monitor the signal quality of channels in cells with adjacent coverage areas to the serving cell (i.e., neighbor cells). Thus, up-to-date signal quality information is maintained for a list of new serving cell candidates. Such an approach allows a new serving cell to be selected quickly, when, for example, the signal quality of a serving cell suddenly becomes unacceptable.

Typically, mobile communication devices can monitor only one channel at a time. Today, therefore, signal quality measurements of neighbor cell channels are performed when the serving cell is transmitting information designated for other communication devices. If, however, the serving cell is consistently transmitting information designated for the mobile communication device, the mobile communication device has no opportunity to measure the signal quality of neighbor cell channels and maintain up-to-date neighbor cell signal quality information. Thus, new serving cell decisions are either delayed or made using neighbor cell signal quality information that is not current.

Therefore, a need exists for an apparatus and method for determining the signal quality of neighbor cells while receiving information from the serving cell.

DESCRIPTION OF A PREFERRED EMBODIMENT

Generally, the present invention provides a method and apparatus for determining the signal quality of communication resources in a communication system. A communication device receives a first portion of an information packet via a primary communication resource. During a time period otherwise allocated for receiving a second portion of the information packet, the communication device instead determines the signal quality of one or more other communication resources. The communication device then requests retransmission of the second portion of the information packet.

By making the necessary signal quality measurements of one or more other communication resources rather than receiving a portion of the information packet, the communication device is able to determine the signal quality of one or more other communication resources despite the transmission of the information packet to the communication device. To recover the lost portion of the information packet, the communication device requests that only the lost portion be retransmitted. Although it is inefficient to retransmit information, the need to perform such signal quality measurements may at times justify the inefficiency. The present invention provides, therefore, a method for a communication device to determine the signal quality of one or more other communication resources while information is being transmitted to the communication device concurrently via the primary communication resource.

Figure 1:
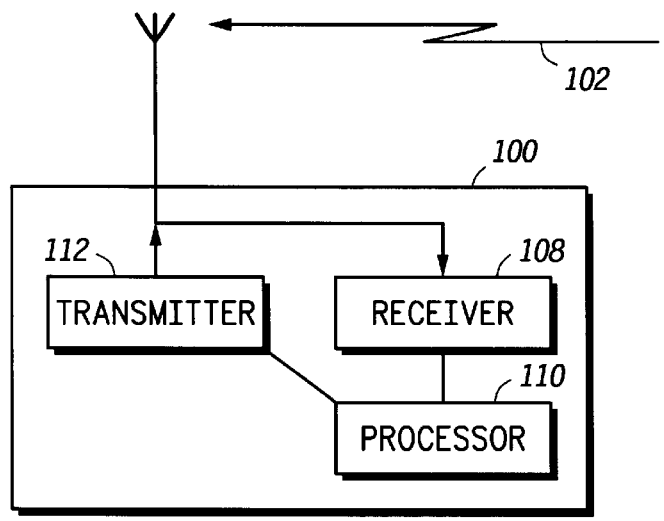
FIG. 1 illustrates a block diagram depection of a communication device in accordance with a preferred embodiment of the present invention.
Figure 2:
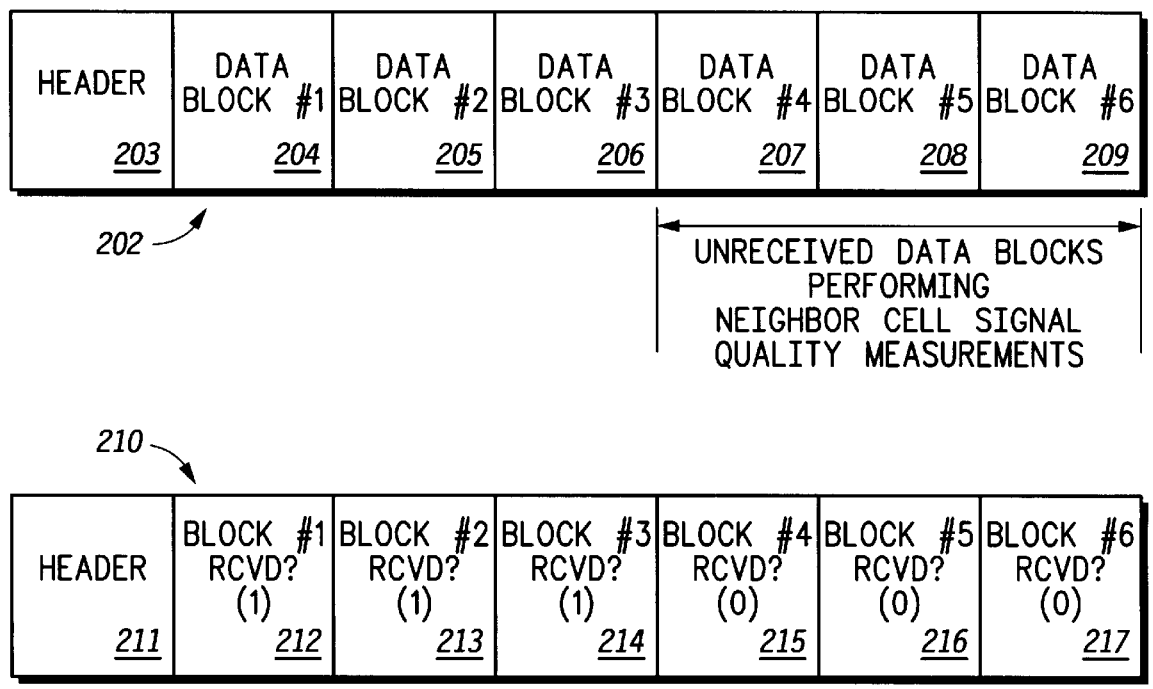
FIG. 2 illustrates a block diagram depiction of information packets transmitted in accordance with a preferred embodiment of the present invention.
Figure 3:
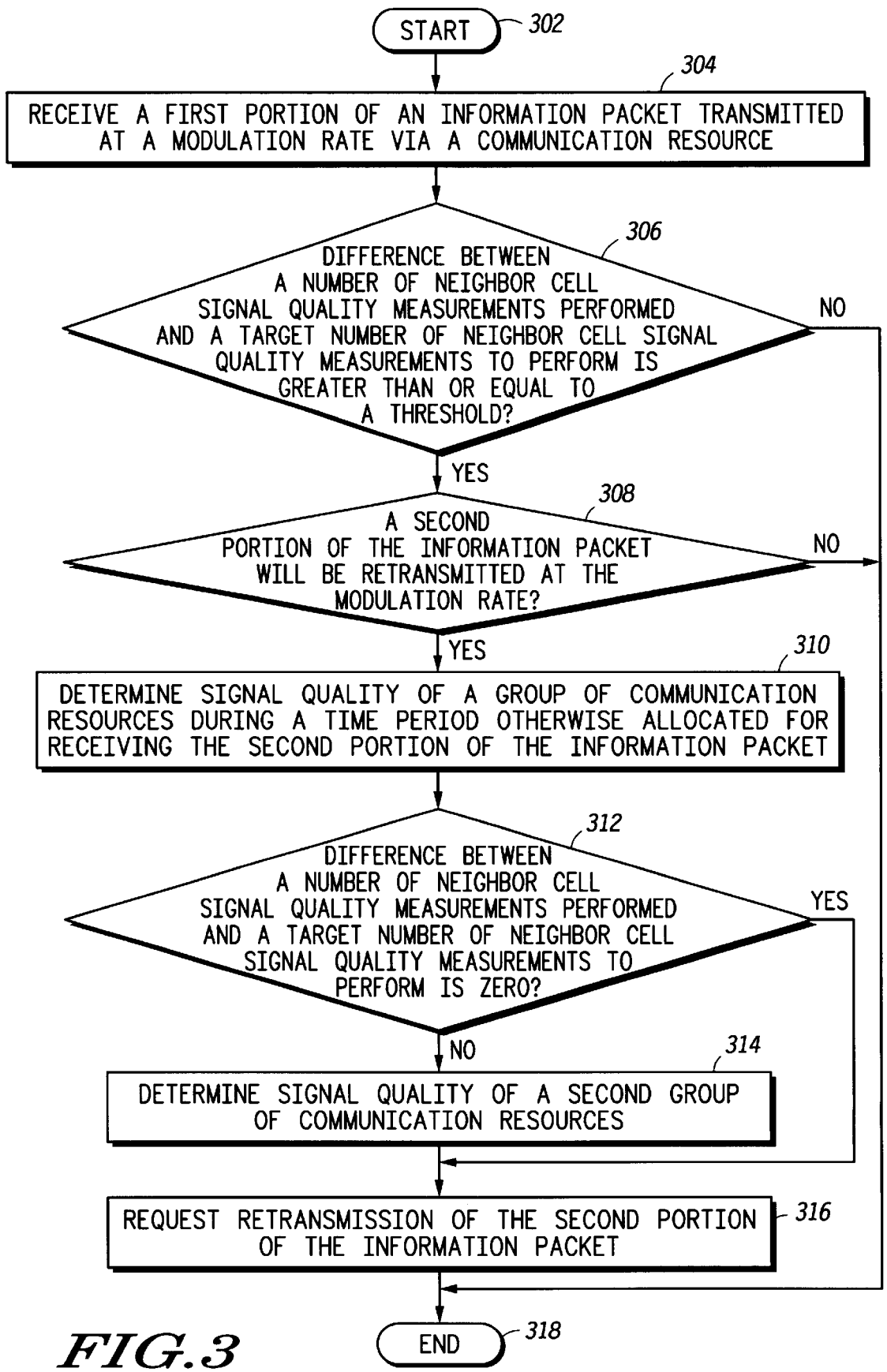
FIG. 3 illustrates a logic flow diagram of steps executed by a communication device in accordance with a preferred embodiment of the present invention.

The present invention can be more fully understood with reference to FIGS. 1–3. FIG. 1 illustrates a block diagram depiction of a communication device 100 in accordance with a preferred embodiment of the present invention. The communication device 100 preferably comprises a receiver 108, a processor 110, and a transmitter 112. The receiver 108 preferably comprises conventional circuitry operated and controlled by routinely developed software, such as the circuitry and software used in amplifiers, demodulators, down-converters, and filters. The transmitter 112 preferably comprises conventional circuitry operated and controlled by routinely developed software, such as the circuitry and software used in amplifiers, modulators, upconverters, and filters. The processor 110 preferably comprises a microprocessor. In the preferred embodiment, the communication device 100 is a "Motorola iDEN d500" handset commercially available from Motorola, Inc. of Schaumburg, Ill.

Operation of the preferred communication device 100 occurs substantially as follows in accordance with the present invention. The receiver 108, receives a first portion of an information packet via a communication resource 102. In the preferred embodiment, the communication resource 102 comprises a time division multiplexed (TDM) channel. Instead of receiving the second portion of the information packet, however, processor 110 instructs the receiver to determine the signal quality of a group of communication resources.

While signal quality determination generally includes all measurements made to characterize the ability of a communication resource to convey information, signal quality determination in the preferred embodiment involves the use of known signal processing techniques to determine the received signal strength and the signal-to-noise ratio of the group of communication resources. Preferably, the group of communication resources comprises a group of TDM channels but does not include the TDM channel by which the first portion of the information packet was received.

The signal quality of the group of TDM channels is determined at the same time that the second portion of the information packet would otherwise be received by the receiver 108. The processor 110, to recover the second portion of the information packet, instructs the transmitter 112 to request retransmission of the second portion of the information packet. Accordingly, transmitter 112 transmits a request for retransmission of the second portion of the information packet.

FIG. 2 illustrates a block diagram depiction of information packets transmitted in accordance with a preferred embodiment of the present invention. Information packet 202 is a data packet comprising a header block 203 and data blocks 204–209. In the preferred embodiment, the header block 203 comprises control information related to the data packet 202 and the overall data transmission such as the number of data blocks contained in the data packet 202, the packet type, identification of the sending communication device, and identification of the target communication device. The data blocks 204–209 of the information packet 202 each contain data and, preferably, a cyclic redundancy check (CRC) used to determine whether the data block was correctly received at the target communication device.

The communication device receives the first portion of data packet 202. The first portion includes header block 203 and data blocks 204–206. In the preferred embodiment, the first portion of an information packet will include at least the header block, since the communication device must receive the header block control information to know the number of data blocks contained in the information packet and whether the information packet is for the communication device.

In the preferred embodiment, while receiving data block 206, the communication device determines that the signal quality of a group of communication resources (i.e. neighbor cell channels) should be measured. The second portion of data packet 202 includes data blocks 207–209. The communication device measures the signal quality of channels from neighboring cells rather than receiving data blocks 207–209.

After performing such signal quality measurements, the communication device transmits information packet 210. In the preferred embodiment, information packet 210 is a data packet acknowledgment that comprises a header block 211 and a bitmap containing the six bit positions 212–217. The header block 211 includes the same type of control information as the header block 203 and additionally includes an indication of whether a bitmap is included in the data packet acknowledgment 210. The bit positions 212–217 correspond to the data blocks 204–209 of data packet 202, respectively. The binary value of a given bit position in an acknowledgment bitmap indicates whether the data block which corresponds to that bit position was received or not. Preferably, a binary zero indicates that the corresponding data block was not received, while a binary one that indicates that the corresponding data block was received.

The bitmap of data packet acknowledgment 210 contains binary ones in bit positions 212–214 indicating that data blocks 204–206 of data packet 202 were received. Since the communication device was measuring the signal quality of neighbor cell channels during the transmission of data blocks 207–209, data blocks 207–209 were not received by the communication device. Accordingly, bit positions 215–217 of acknowledgment data packet 210 contain binary zeroes. Thus, the communication device uses the data packet acknowledgment 210 to request retransmission of the second portion of data packet 202.

FIG. 3 illustrates a logic flow diagram 300 of steps executed by a communication device in accordance with a preferred embodiment of the present invention. A preferred communication device must both receive information packets and measure the signal quality of various communication resources such as neighbor cell channels. The logic flow begins (302) when a communication device receives (304) a first portion of an information packet that was transmitted at a particular modulation rate via a communication resource (i.e., preferably a serving cell channel). In the preferred embodiment, communication devices attempt to perform neighbor cell signal quality measurements at an average rate of one per 180 milliseconds. Accordingly, the target rate is one neighbor cell signal quality measurement per 180 milliseconds, and at any moment, the target number of neighbor cell signal quality measurements is, therefore, the number of measurements that would be performed were a neighbor cell signal quality measurement performed every 180 milliseconds.

To determine whether to measure the signal quality of neighbor cell channels, the communication device periodically compares the number of neighbor cell signal quality measurements actually performed to the target number of neighbor cell signal quality measurements. If (306) the difference between a number of neighbor cell signal quality measurements performed and a target number of neighbor cell signal quality measurements to perform is less than a preferred threshold of 16, the logic flow ends (318). In other words, if the communication device is less than 16 neighbor cell signal quality measurements behind the target number of measurements at a particular time, neighbor cell signal quality measurements should not at that time take priority over receiving the information packet.

However, if (306) the difference between the number of neighbor cell signal quality measurements performed and the target number of neighbor cell signal quality measurements to perform is greater than or equal to the preferred threshold of 16, the communication device does give priority to neighbor cell signal quality measurements. Accordingly, the communication device first determines whether the second portion of the information packet, if retransmitted, would be retransmitted at the same modulation rate as originally transmitted. In the preferred embodiment, information may be retransmitted at a lower modulation rate than that used for the original transmission. Retransmitting information at a lower modulation rate requires more time, and is therefore more costly than retransmitting the information at the same modulation rate.

Preferably, the added cost of reduced modulation rate retransmissions are avoided. Therefore, if (308) the second portion of the information packet will not be retransmitted at the same modulation rate, the logic flow ends (318).

Otherwise, when (308) it is determined that the second portion of the information packet will be retransmitted at the same modulation rate as the second portion was originally transmitted, the communication device uses the time period otherwise allocated for receiving the second portion of the information packet to determine (310) the signal quality of a group of communication resources (i.e. preferably a group of neighbor cell channels). The communication device continues to perform such signal quality measurements until either the target number of neighbor cell signal quality measurements is reached or the transmission of the information packet is complete.

If (312) the target number of neighbor cell signal quality measurements is reached (i.e., the difference between a number of neighbor cell signal quality measurements performed and a target number of neighbor cell signal quality measurements to perform is zero), the communication device receives a third portion of the information packet.

Preferably, the third portion comprises the remainder of the information packet data blocks. The communication device then requests (316) retransmission of the second portion of the information packet and the logic flow ends (318).

Otherwise, if (312) the target number of neighbor cell signal quality measurements is not reached before the transmission of the information packet is complete, the communication device determines (314) the signal quality of a second group of communication resources prior to requesting retransmission of the second portion of the information packet. In the preferred embodiment, the signal quality of the second group of communication resources is determined before requesting any retransmissions or transmitting any new information packets. Thus, signal quality determination is prioritized in order to achieve the target number of neighbor cell signal quality measurements. Upon reaching the target number of neighbor cell signal quality measurements, then, the retransmission of the second portion of the information packet is requested (316) and the logic flow ends (318).

In the preferred embodiment, the number of signal quality measurements performed and the retransmission modulation rate are used to determine whether to perform neighbor cell signal quality measurements rather than receiving a portion of an information packet. In an alternate embodiment, the determination of whether a difference between the rate of neighbor cell signal quality measurement and the target rate of neighbor cell signal quality measurement is greater than or equal to a threshold may be used to determine whether to measure neighbor cell signal quality. In another alternate embodiment, the determination of whether the signal quality of the serving cell communication resource (i.e. the communication resource used to convey the information packet) is less than or equal to a quality threshold may be used to determine whether to measure neighbor cell signal quality. The signal quality of the serving cell communication resource less than or equal to a quality threshold may indicate that a new serving cell needs to be selected, and therefore, the neighbor cell signal quality measurements need to be updated.

The present invention, as implemented in the preferred embodiment, provides an apparatus and method for determining the signal quality of neighbor cell channels while receiving information from a serving cell. Neighbor cell signal quality measurements are performed instead of receiving a portion of a data packet from the serving cell. Upon completing the neighbor cell signal quality measurements, retransmission of the unreceived portion of the data packet is requested. Thus, during the receipt of data packets, neighbor cell signal quality levels can be determined for a communication device without loosing data.

While the present invention has been particularly shown and described with reference to particular embodiments thereof, it will be understood by those skilled in the art that various changes in form and details may be made therein without departing from the spirit and scope of the present invention.

We claim:

1. A method for a communication device to determine a signal quality of a group of communication resources during a conveyance of an information packet in a communication system, the method comprising steps of:

receiving a first portion of the information packet via a communication resource;

determining the signal quality of the group of communication resources during a time period otherwise allocated for receiving a second portion of the information packet wherein the group of communication resources does not include the communication resource; and requesting retransmission of the second portion of the information packet, further comprising the step of determining whether to measure the signal quality of the group of communication resources prior to the step of determining the signal quality of the group of communication resources, wherein the step of receiving comprises the step of receiving the first portion of the information packet via the communication resource; wherein the information packet was transmitted at a modulation rate; and wherein the step of determining whether to measure the signal quality of the group of communication resources comprises the step of determining whether the second portion of the information packet will be retransmitted at the modulation rate.

2. The method of claim 1, further comprising the step of receiving a third portion of the information packet prior to the step of requesting.

3. A method for a communication device to determine a signal quality of a group of communication resources during a conveyance of an information packet in a communication system, the method comprising steps of:

receiving a first portion of the information packet via a communication resource;

determining the signal quality of the group of communication resources during a time period otherwise allocated for receiving a second portion of the information packet, wherein the group of communication resources does not include the communication resource; and requesting retransmission of the second portion of the information packet, further comprising the step of determining whether to measure the signal quality of the group of communication resources prior to the step of determining the signal quality of the group of communication resources, wherein the step of determining whether to measure the signal quality of the group of communication resources comprises the step of determining whether a difference between a rate of neighbor cell signal quality measurement and a target rate of neighbor cell signal quality measurement is greater than or equal to a threshold.

4. A method for a communication device to determine a signal quality of a group of communication resources during a conveyance of an information packet in a communication system, the method comprising steps of:

receiving a first portion of the information packet via a communication resource;

determining the signal quality of the group of communication resources during a time period otherwise allocated for receiving a second portion of the information packet, wherein the group of communication resources does not include the communication resource; and requesting retransmission of the second portion of the information packet, further comprising the step of determining whether to measure the signal quality of the group of communication resources prior to the step of determining the signal quality of the group of communication resources, wherein the step of determining whether to measure the signal quality of the group of communication resources comprises the step of determining whether a difference between a number of neighbor cell signal quality measurements performed and a target number of neighbor cell signal quality measurements to perform is greater than or equal to a threshold.

5. The method of claim 4, wherein the target number of neighbor cell signal quality measurements is achieved by performing a neighbor cell signal quality measurement every 180 milliseconds.

6. The method of claim 4, wherein the threshold is 16 neighbor cell signal quality measurements.

7. A method for a communication device to determine a signal quality of a group of communication resources during a conveyance of an information packet in a communication system, the method comprising steps of:

receiving a first portion of the information packet via a communication resource;

determining the signal quality of the group of communication resources during a time period otherwise allocated for receiving a second portion of the information packet, wherein the group of communication resources does not include the communication resource; and requesting retransmission of the second portion of the information packet, further comprising the step of determining whether to measure the signal quality of the group of communication resources prior to the step of determining the signal quality of the group of communication resources, wherein the step of determining whether to measure the signal quality of the group of communication resources comprises the step of determining whether a signal quality of the communication resource is less than or equal to a quality threshold.

8. The method of claim 1, wherein the step of requesting comprises determining the signal quality of a second group of communication resources prior to requesting retransmission of the second portion of the information packet.

9. The method of claim 1, wherein the step of requesting comprises determining the signal quality of a second group of communication resources prior to transmitting information packets and prior to transmitting retransmission requests.

10. The method of claim 1, wherein the communication resource comprises a time division multiplexed channel.

11. The method of claim 1, wherein the group of communication resources comprises a group of time division multiplexed channels.

12. The method of claim 1, wherein the information packet is a data packet, divided into a header block and at least one data block, comprising control information and data.

13. The method of claim 12, wherein the first portion of the information packet comprises the header block.

14. A communication device comprising:

a receiver that receives a first portion of an information packet via a communication resource;

a processor, coupled to the receiver, that instructs the receiver to determine a signal quality of a group of communication resources during a time period otherwise allocated for receiving a second portion of the information packet, wherein the group of communication resources does not include the communication resource, that determines whether to measure the signal quality of the group of communication resources prior to determining the signal quality of the group of communication resources, wherein the information packet was transmitted at a modulation rate, and wherein determining whether to measure the signal quality of the group of communication resources comprises determining whether the second portion of the information packet will be retransmitted at the modulation rate; and a transmitter, coupled to the processor, that transmits, when instructed by the processor, a request for retransmission of the second portion of the information packet.

* * * * *